United States Patent Office 3,356,550
Patented Dec. 5, 1967

3,356,550

CHEMICAL MILLING OF ALUMINUM ALLOYS

Gerald L. Stiffler, Portland, Oreg., and John A. Tershin, Seattle, Wash., assignors to The Boeing Company, Seattle, Wash., a corporation of Delaware No Drawing. Filed Mar. 16, 1964, Ser. No. 352,342
13 Claims. (Cl. 156—22)

This invention relates in general to chemical milling and in particular to a process having variable rates of removing material in its milling operation with adjustable solution ranges accounting for the variable rates of material removed.

It is an object of this invention to achieve a chemical milling process with its related solutions for aluminum metal having appreciable copper and zinc contents.

It is another object of this invention to achieve a chemical milling process with its requisite surface finish and configuration on an aluminum alloy having appreciable copper and zinc contents.

It is another object of this invention to achieve a chemical milling process on an aluminum alloy having appreciable copper and zinc while controlling its intergranular attack on the grain boundaries of the metal to a uniform rate.

Further objects and applications of this invention will become apparent from the following description and the appended claims.

Chemical milling, as described in U.S. Patent #2,739,047 is the process of removing metal in a controlled manner by selective chemical etching in either an acid or an alkaline solution to produce recessed patterns, tapers, overall reduction of metal surfaces and various other types of controlled metal removal. This process is used to produce configurations or to achieve metal removal which either cannot be machined or can be machined only at unreasonably high cost and inconvenience.

Although chemical etching has been used for many years, deep etching or milling to produce structural contours is relatively a new procedure. The chemical milling process consists of the three basic steps of cleaning, masking and milling. An additional step can be scribing if it is so desired; this step involves altering the masking layer so as to allow limited etching within the masked area.

The cleaning step consists of removing grease, soils, heavy oxides and other contamination from the surface of the specimen to be subjected to the chemical milling. The reason for such removal of these materials is that these contaminates will interfere with a uniform chemical milling operation by masking the underlying material from the attack of the acid or alkali employed.

The masking step consists of imposing a tight impregnable mask upon the surface which it is desired to keep from being chemically milled. In this step it is an object to achieve a complete absence of chemical attack from the area masked.

The milling step consists of exposing the bare surfaces of the particular part to the attack of an acid or an alkali. This attack is performed at a controlled rate, usually in the neighborhood of 0.001 inch/minute, until the required metal is removed. Moderate, nondirectional agitation of the solution is required to minimize concentration and temperature gradients. However, care is to be taken so the solution does not impinge directly upon the part. It is also desirable to have vertical part circulation to prevent gas channeling and to smooth out scratches and other surface defects. Proper circulation practices are important to ensure uniform milling practices.

The usual milling procedure is to determine the current milling rate and expose the part to the milling solution for 50% to 80% of the calculated time required to attain the desired depth of cut. The part is then measured to redetermine the milling rate and to detect any excessive tapering or other irregularities requiring special processing. Then the part is reimmersed in the milling solution until the desired depth has been reached. Very fine tolerances may be met by performing the final milling operation at a very slow milling rate using a conventional alkaline etch-cleaner, a bright-dip or an acid type solution. This final step can also be used to remove sanding scratches, machining burrs and slight tapers on the part which would otherwise require excessive machining expense.

In selecting a milling solution for aluminum, an alkaline or an acid solution achieves the metal removal while using the same processing cycle with essentially the same processing materials and equipment. Considerations affecting the selection between the acid and alkaline milling solutions are initial facility costs, operating costs, the range of alloys to be milled and the physical properties required of the milled aluminum surface. The alkaline milling solution has the advantages of much lower facility costs as well as slightly lower overall operating costs. In actual practice, this economic advantage is somewhat limited by the need to maintain separate facilities or separate chemical control ranges for each major series of aluminum alloys processed.

The chemical solutions of this invention have the additional advantages of attaining closer thickness tolerances, smoother surface finishes and greater fatigue life. The surface finish produced by chemical milling is influenced by variations in the chemistry and alloy structure of the aluminum and by the chemical etching and filming mechanisms which take place during dissolution. Simple alkaline milling solutions reproduce surface irregularities such as scratches, nicks and gouges and may produce rough, sharp grain boundaries. More sophisticated solutions, such as the milling solutions described herein, reduce surface irregularities, produce grain boundaries having a smooth, rolling character and consistently yield finer surface finishes than do previous solutions. The fatigue life of chemically milled aluminum parts with shallow cuts (less than 0.04 inch) is equivalent to that of machined parts having a similar surface finish. With deeper cuts, alkaline milled parts are very slightly inferior, and acid milled parts are noticeably superior, when compared to parts machined to the same configuration. The sharp grain boundaries resulting from alkaline milling are, in effect, stress risers which can lead to fatigue failure. The smooth "rolling" grain boundaries produced by the instant milling solutions reduce the stress riser effect, promoting maximum fatigue life.

This invention relates to an improvement in the milling stage of the chemical milling operation for an aluminum alloy high in copper and zinc, such as 2219T37 aluminum. This invention could be practiced on any standard aluminum or aluminum alloy, but is particularly adapted to aluminum having high contents of zinc and copper. It achieves the desired surface finish, the right fillet configuration and the proper finish after intergranular attack on metals. In actual use the aluminum alloy 2219T37 is employed in the design of tank gores with the resulting configuration needing a chemical milling operation to remove a great amount of excess metal because other standard millings practices would not be practical or capable of being used. The weight removal from the milling results in greatly improved economy of operation.

This invention, which is an improvement over past chemical milling operations of this 2219T37 aluminum alloy, consists of an etch process with unique solutions being employed in this etch process. The process consists of a first step of milling using a high caustic-sulfide etchant solution for a preliminary deep etch and a caustic-cyanide solution for a final etch.

The problem presented in 2219T37 aluminum alloy is that to achieve a good chem-milling operation the copper and zinc, along with the aluminum, must all be etched away at the same rate to avoid pitting and cavities on the surface of the alloy. If one constituent of an alloy is dissolved at a more rapid rate than the other constituents, pitting and other flaws will result from this more rapid removal. This problem is solved by using our solutions because certain constituents, such as sodium sulfide and sodium cyanide, act as sequestering agents in the caustic solution. These two sequestering agents achieve the same result of removing material by different approaches. The sodium sulfide forms an insoluble precipitate with the aluminum and the alloying elements in the aluminum as they are removed by the alkaline attack. The sodium cyanide dissolves the aluminum and the alloying elements in the aluminum, thus forming soluble complexes which also effectively removes the substances resulting from the alkaline attack.

The instant invention employs the following solution for the first step in rapid milling operation at 190° F.:

| | Ounces/gal. |
|---|---|
| Sodium hydroxide (NaOH) | 20 to 30 |
| Sodium sulfide ($Na_2S$) | 15 to 25 |
| Aluminum (Al) | 5 to 15 |
| Sulfonated castor oil | 0.1 |
| Tributyl phosphate | 0.1 |
| Water, balance. | |

In a chemical milling operation as set forth above, the milling rate is increased by enabling better contact between the material to be milled and the chemical milling solution by adding a surface wetting agent selected from the group consisting of sulfonated castor oil, sodium xylene sulfonate and triethanolamine.

After the initial rapid removal of material by the rough milling step, the following solution is employed as a fine etch for the subsequent slower removal of the material down to the desired thickness (also heated to 190° F.):

| | Oz./gal. |
|---|---|
| Sodium hydroxide (NaOH) | 10 to 21 |
| Sodium cyanide (NaCN) | 6 to 20 |
| Aluminum (Al) | 3 to 15 |
| Water, balance. | |

The term "metallic sheet" as used in the following chemical milling procedure and as used in this invention implies any stock or sheets of constant or varying thickness and further includes other shapes, such as tubes, bars or rods which are merely sheets or stock formed into hollow or solid form.

Chemical milling or etching may be done simultaneously on more than one surface and in wide variety of designs. There is no limitation on the types and sizes of the formed material which may be treated by this process.

The practice of this invention of chemical milling is to evenly or uniformly chemical mill or etch out the material to be removed after the metallic sheet has been formed. This is accomplished by exposing the desired areas of the sheet to the action of the above described solutions. These solutions attack the metallic sheet at the exposed areas (unmasked areas) resulting in a skin similar to the conventional mill skin. This process is usually carried out in a tank wherein the formed article is immersed. A formed article completely immersed in a caustic-containing tank, with the caustic having an additive such as a sulfide or a cyanide, will be evenly attacked at the exposed areas, thus forming chemically-milled areas at those points. A vinyl etch-proof film, for example, can be used to protect the areas not to be treated.

In actual practice the metallic sheet was vapor degreased with a standard solvent which achieves this result with an example being trichloroethylene. Alkaline cleaning was the next step which removes all rust, scale, etc. Any normal commercial alkaline cleaner achieves this result. To further insure a completely clean, free surface, the metal is cleaned with a deoxidizer.

After this preliminary preparation, the metallic sheet was masked where desired with four dip coats or equivalent applications of an elastomeric type maskant followed by air curing for 16 hours. Any necessary scribing is done at this point. Next the part is submerged in a 40- to 50-gallon tank containing a composition of the first chemical range given above. The solution in the tank is properly circulated along with uniform movement of the part while the chemical milling step is proceeding with the temperature of the solution being maintained at 190°±10° F.

After 50% to 80% of the initial calculated time required for removal of the desired amount of metal, the metallic sheet is removed from the tank containing the first solution and immediately rinsed free of the solution. Then the metallic sheet is subjected to the same cleaning cycle and then immersed into a second tank containing the second solution given above. This solution is allowed to react with the metallic sheet until the desired dimensions are achieved. Again the part is rinsed free of the solution.

The amount and rate of etching is dependent on various factors, such as temperature, time, caustic concentration and type of starting material. The piece to be treated may be immersed for a set period, removed, washed, pickled, and/or anodized or otherwise surface treated before removal of the film. It will be found that exposed areas of the piece have been evenly attacked. It will be apparent that if attacks of various depths are desired that the sheet may be removed from the etching bath and additional protective film placed on areas where further attack is not wanted. Further the formed material can be constantly or intermittently withdrawn from the treatment zone so that various zones of the material will be etched for continuously or intermittently varying periods of time. Thus, it can be seen that tapered skins or sheets can easily be formed by this process.

It is commonly known that the etched surface of aluminum alloy treated in an alkali solution which does not have any additives in the solution results in a bumpy and nodular finish (see Newman et al., Patent Numbers 2,795,490 and 2,795,491). However, where the solution is a nodulizing etching solution the surface so obtained is free from this type of finish and has a uniform texture similar to a mechanically milled specimen.

The advantages of the instant invention are numerous. Not only is 2219T37 aluminum uniformly milled but a desired surface finish free from pitting and other flaws is attained. The tolerances attained are of the order of ±0.002 inch as against the usual tolerances of ±0.010 inch in mechanical milling. There is no limitation as to size and complexity of design in chemical milling as there is in mechanical milling. A further advantage of this chemical milling process is the extreme ease in forming various configurations on the surfaces to be treated. For example, load distribution patterns in the form of stiffeners can be easily formed integrally on sheet surfaces by the aircraft load designer. The process further permits a simplified inexpensive process of construction eliminating many riveting, seam welding and spot welding joining methods. Further, the chemical process of milling is one which may be more easily and accurately controlled. Also, with the elimination of much riveting and a multiplicity of joints a structure having a greater degree of liquid tightness is possible. Further, a great number of formed sheets may be treated in a single tank in one operation.

We claim:

1. A chemical milling solution substantially comprised as follows:

| | Ounces/gal. |
|---|---|
| Sodium hydroxide (NaOH) | 20 to 30 |
| Sodium sulfide ($Na_2S$) | 15 to 25 |
| Aluminum (Al) | 5 to 15 |
| Sulfonated castor oil | 0.1 |
| Tributyl phosphate | 0.1 |
| Water, balance. | |

2. A chemical milling solution for aluminum and aluminum alloys substantially comprised as follows:

| | Ounces/gal. |
|---|---|
| Sodium hydroxide (NaOH) | 10 to 21 |
| Sodium cyanide (NaCN) | 6 to 20 |
| Aluminum (Al) | 3 to 15 |
| Water, balance. | |

3. A chemical milling process for aluminum and aluminum alloys comprising the steps of initially freeing the surface of the alloy from foreign substances, attacking the surface of the alloy with a solution substantially comprised of

| | Ounces/gal. |
|---|---|
| Sodium hydroxide (NaOH) | 20 to 30 |
| Sodium sulfide ($Na_2S$) | 15 to 25 |
| Aluminum (Al) | 5 to 15 |
| Sulfonated castor oil | 0.1 |
| Tributyl phosphate | 0.1 |
| Water, balance. | |

and finally complete the attack on the surface of the alloy with a solution substantially comprised of

| | Ounces/gal. |
|---|---|
| Sodium hydroxide (NaOH) | 10 to 21 |
| Sodium cyanide (NaCN) | 6 to 20 |
| Aluminum (Al) | 3 to 15 |
| Water, balance. | |

4. The chemical milling process for aluminum and aluminum alloys as claimed in claim 3 wherein the aluminum is an alloy designated as 2219T37.

5. A chemical milling process for aluminum and aluminum alloys comprising the steps of initially freeing the surface of the alloy from foreign substances, attacking the surface of the alloy for 50% to 80% of the desired metal removal with a solution substantially comprised of

| | Ounces/gal. |
|---|---|
| Sodium hydroxide (NaOH) | 20 to 30 |
| Sodium sulfide ($Na_2S$) | 15 to 25 |
| Aluminum (Al) | 5 to 15 |
| Sulfonated castor oil | 0.1 |
| Tributyl phosphate | 0.1 |
| Water, balance. | |

and finally completing the attack on the surface of the alloy for the required time to achieve the desired dimensions with a solution substantially comprised of

| | Ounces/gal. |
|---|---|
| Sodium hydroxide (NaOH) | 10 to 21 |
| Sodium cyanide (NaCN) | 6 to 20 |
| Aluminum (Al) | 3 to 15 |
| Water, balance. | |

6. The chemical milling process for aluminum and aluminum alloys as claimed in claim 5 wherein the aluminum is an alloy designated as 2219T37.

7. A chemical milling process for aluminum and aluminum alloys comprising the steps of degreasing the alloy, alkaline cleaning the alloy, deoxidizing the alloy, attacking the exposed surface of the alloy for 50% to 80% of the desired metal removal with a solution substantially comprised of

| | Ounces/gal. |
|---|---|
| Sodium hydroxide (NaOH) | 20 to 30 |
| Sodium sulfide ($Na_2S$) | 15 to 25 |
| Aluminum (Al) | 5 to 15 |
| Tributyl phosphate | 0.1 |
| Sulfonated castor oil | 0.1 |
| Water, balance. | |

rinsing the alloy free of the above solution, deoxidizing the alloy, attacking the surface of the alloy for the requisite time to achieve the desired dimensions with a solution substantially comprised of

| | Ounces/gal. |
|---|---|
| Sodium hydroxide (NaOH) | 10 to 21 |
| Sodium cyanide (NaCN) | 15 to 25 |
| Aluminum (Al) | 3 to 15 |
| Water, balance. | |

and rinsing the alloy free of the solution.

8. A chemical milling process for aluminum and aluminum alloys as claimed in claim 7 wherein the aluminum alloy is 2219T37 aluminum.

9. A chemical milling process for aluminum and aluminum alloys comprising the steps of initially freeing the surface of the alloy from foreign substances, attacking the exposed surface of the alloy for 50% to 80% of the desired metal removal with a solution substantially comprised of

| | Ounces/gal. |
|---|---|
| Sodium hydroxide (NaOH) | 20 to 30 |
| Sodium sulfide ($Na_2S$) | 15 to 25 |
| Aluminum (Al) | 5 to 15 |
| Sulfonated castor oil | 0.1 |
| Tributyl phosphate | 0.1 |
| Water, balance. | |

rinsing the alloy free of the solution, freeing the surface of the alloy from foreign substances, attacking the exposed surface of the alloy for the requisite time to achieve the desired dimensions with a solution substantially comprised of

| | Ounces/gal. |
|---|---|
| Sodium hydroxide (NaOH) | 10 to 21 |
| Sodium cyanide (NaCN) | 15 to 25 |
| Aluminum (Al) | 3 to 15 |
| Water, balance. | |

and rinsing the alloy free of the solution.

10. A chemical milling process for aluminum and aluminum alloys as claimed in claim 9 wherein the aluminum alloy is 2219T37 aluminum.

11. In a chemical milling operation on aluminum and aluminum alloys the method of increasing the milling rate of a sodium hydroxide sodium sulfide solution by enabling better contact between the material to be milled and the chemical milling solution comprising adding a surface wetting agent to the chemical milling solution, said wetting agent selected from the group consisting of sulfonated castor oil, sodium xylene sulfonate and triethanolamine.

12. A chemical milling process for aluminum and aluminum alloys comprising the steps of initially freeing the surface of the alloy from foreign substances, attacking the exposed surface of the alloy for 50% to 80% of the desired metal removal with a solution maintained at 190°±10° F. substantially comprised of

| | Ounces/gal. |
|---|---|
| Sodium hydroxide (NaOH) | 20 to 30 |
| Sodium sulfide ($Na_2S$) | 15 to 25 |
| Aluminum (Al) | 5 to 15 |
| Sulfonated castor oil | 0.1 |
| Tributyl phosphate | 0.1 |
| Water, balance. | |

rinsing the alloy free of the solution, freeing the surface of the alloy from foreign substances, attacking the exposed surface of the alloy for the requisite time to achieve the desired dimensions with a solution maintained at 190°±10° F. substantially comprised of

| | Ounces/gal. |
|---|---|
| Sodium hydroxide (NaOH) | 10 to 21 |
| Sodium cyanide (NaCN) | 15 to 25 |
| Aluminum (Al) | 3 to 15 |
| Water, balance. | |

and rinsing the alloy free of the solution.

13. A chemical milling process for aluminum and aluminum alloys as claimed in claim 12 wherein the aluminum alloy is 2219T37 aluminum.

References Cited

UNITED STATES PATENTS

| | | | |
|---|---|---|---|
| 2,795,490 | 6/1957 | Newman et al. | 156—22 |
| 2,795,491 | 6/1957 | Newman et al. | 156—22 |
| 2,828,194 | 3/1958 | Hopkins et al. | 156—14 |
| 2,869,267 | 1/1959 | Holman | 156—22 X |

FOREIGN PATENTS

| | | |
|---|---|---|
| 750,803 | 6/1956 | Great Britain. |

JACOB H. STEINBERG, *Primary Examiner.*